United States Patent
Champagne et al.

(10) Patent No.: US 9,525,440 B2
(45) Date of Patent: Dec. 20, 2016

(54) TRANSMISSION-BASED TEMPERATURE CONTROL FOR AN ELECTRICAL DEVICE

(71) Applicant: Silicon Laboratories Inc., Austin, TX (US)

(72) Inventors: Gerald Champagne, Buda, TX (US); David Mervine, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 139 days.

(21) Appl. No.: 14/140,972

(22) Filed: Dec. 26, 2013

(65) Prior Publication Data
US 2015/0189788 A1 Jul. 2, 2015

(51) Int. Cl.
*H01Q 11/12* (2006.01)
*H04Q 1/04* (2006.01)
*H04B 1/04* (2006.01)
*H04B 1/036* (2006.01)

(52) U.S. Cl.
CPC ............. *H04B 1/04* (2013.01); *H04B 1/036* (2013.01)

(58) Field of Classification Search
CPC ..................... H04B 1/04; H04B 1/036
USPC ..... 455/117, 127.1, 127.2; 330/289; 315/32, 315/34
See application file for complete search history.

(56) References Cited

U.S. PATENT DOCUMENTS

| | | | | |
|---|---|---|---|---|
| 5,519,886 A | * | 5/1996 | Gilbert et al. | 455/115.1 |
| 6,169,884 B1 | * | 1/2001 | Funk | H04B 1/036 455/522 |
| 7,561,858 B2 | * | 7/2009 | Nagano | 455/127.1 |
| 7,561,859 B2 | * | 7/2009 | Nagano | 455/127.1 |
| 8,433,256 B2 | * | 4/2013 | Rofougaran | H04Q 9/00 455/120 |
| 2003/0050104 A1 | * | 3/2003 | Matsumura et al. | 455/574 |
| 2008/0025341 A1 | * | 1/2008 | Rao | H04W 72/048 370/468 |
| 2012/0274208 A1 | * | 11/2012 | Chen et al. | 315/34 |
| 2012/0329410 A1 | * | 12/2012 | Balakrishnan | G06F 1/206 455/127.1 |
| 2013/0063042 A1 | * | 3/2013 | Bora et al. | 315/292 |
| 2014/0376430 A1 | * | 12/2014 | Su | H04W 52/0212 370/311 |

* cited by examiner

*Primary Examiner* — Nguyen Vo
(74) *Attorney, Agent, or Firm* — Trop Pruner & Hu, P.C.

(57) ABSTRACT

A method includes estimating a temperature change to an integrated circuit, which is associated with a pending transmission from the integrated circuit. The method includes, based on the estimated temperature change, regulating at least one parameter that is associated with the pending transmission to maintain a temperature of the integrated circuit below a temperature threshold.

17 Claims, 6 Drawing Sheets

TRANSMISSION-BASED TEMPERATURE CONTROL FOR AN ELECTRICAL DEVICE

BACKGROUND

A given electrical circuit may have an associated maximum allowable temperature at which the circuit may operate before the circuit fails, incurs damage and/or operates incorrectly. The temperature of the circuit may be influenced by several sources, such as heat dissipating components of the circuit, as well as the ambient temperature of the surrounding environment.

SUMMARY

In an example embodiment, a method includes estimating a temperature change to an integrated circuit, which is associated with a pending transmission from the integrated circuit. The method includes, based on the estimated temperature change, regulating at least one parameter that is associated with the pending transmission to maintain a temperature of the integrated circuit below a temperature threshold.

In another example embodiment, an apparatus includes a temperature sensor to sense an ambient temperature, a radio and a processing core. The processing core estimates a temperature change to the apparatus in response to a pending transmission by the radio, and the processing core controls the radio to regulate at least one parameter of the pending transmission based at least in part on the ambient temperature sensed by the temperature sensor and the estimated temperature change.

In yet another example embodiment, an apparatus includes a lighting element and an integrated circuit. The integrated circuit includes a packet radio and a processing core to use the radio to communicate with a lighting controller to regulate operation of the lighting element. The processing core is adapted to estimate a temperature change to the integrated circuit associated with a pending transmission by the radio, and based at least in part on the estimated temperature change, the processor core is adapted to regulate at least one parameter that is associated with the pending transmission.

Advantages and other desired features will become apparent from the following drawings, description and claims.

DETAILED DESCRIPTION

Figure 1:
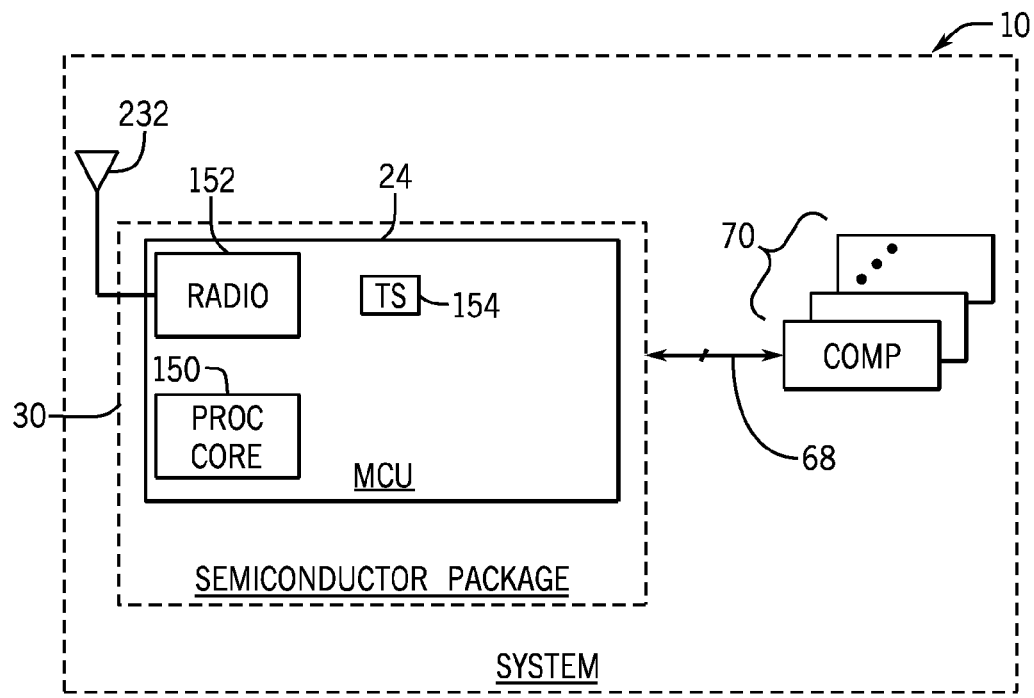
FIG. 1 is a schematic diagram of a microcontroller unit (MCU)-based system according to an example embodiment.

Techniques and systems are disclosed herein for purposes of regulating an operating temperature of an electrical circuit, such as a computer system or an integrated circuit (IC). In this manner, the electrical circuit may be packaged as a part or device, which has an associated nominal maximum allowable temperature. Operating above this temperature may adversely affect the device, causing to the device fail, operate incorrectly and/or incur irreversible damage. In the following discussion, the maximum allowable temperature is referred to herein as the "$T_{FAIL}$" temperature threshold of the device. Factors that contribute to the device reaching the $T_{FAIL}$ maximum operating temperature are the ambient temperature (herein called the "$T_{AMB}$" temperature), or the temperature in the immediate environment of the IC; and the temperature rise, or change, of the device, which is caused by self-heating of the device (represented by a temperature called "$T_{SELF}$" herein) due to the operations of power dissipating components (transistors, for example) of the device.

In accordance with example embodiments, the device is a constructed to wirelessly transmit data, and when operating to transmit data, the $T_{SELF}$ self-heating temperature (a delta temperature rise) may be a significant factor that controls whether the temperature of the device exceeds the $T_{FAIL}$ temperature threshold, especially if the $T_{AMB}$ ambient temperature of the device is already relatively close (10 to 20° Celsius (C), for example) of the $T_{FAIL}$ temperature threshold.

In accordance with example embodiments that are disclosed herein, the device controls the timing and characteristics of its wireless transmissions in a manner that maintains the temperature of the device below the $T_{FAIL}$, temperature threshold; and a particular advantage of this control is that the device may operate in ambient temperatures that are relatively close to the $T_{FAIL}$ temperature threshold. As described herein, in accordance with example embodiments, the device performs this control for each upcoming, pending wireless transmission by sensing its current $T_{AMB}$ ambient temperature and estimating the $T_{SELF}$ self-heating temperature for the pending transmission. Based on these and possibly other factors, the device selectively regulates one or more parameters associated with the pending transmission to maintain the temperature of the device below the $T_{FAIL}$, temperature threshold. As examples, the regulated parameter may be, as examples, a timing of the transmission (i.e., when the transmission begins) or a power level of the transmission.

For example, in accordance with example embodiments, a pending transmission may be scheduled to occur at a general given time and power level. If the device determines that predicted or estimated $T_{SELF}$ temperature at the end of the transmission causes the $T_{AMB}$ ambient temperature of the device to exceed the $T_{FAIL}$ maximum temperature (i.e., $T_{SELF} > T_{FAIL} - T_{AMB}$), then the device does not perform the pending transmission, as intended. Instead, the device may perform corrective action, such as incurring a delay, or period of waiting, to allow the device to cool before transmitting; lowering the power transmission level to lower the $T_{SELF}$ self-heating temperature or perhaps even aborting the pending transmission.

As described herein, the above-recited approach of waiting for the device to cool recognizes that the currently-measured, or sensed, $T_{AMB}$ ambient temperature of the device may not be the device's true ambient temperature, but rather, the sensed temperature may be the ambient temperature in addition to some degree of residual heat due to self-heating of the device from a previous transmission. In accordance with some embodiments, systems and techniques are disclosed herein for purposes of addressing the residual self-heating.

As a more specific example of a device that may employ the above-described thermal regulation, FIG. 1 depicts an MCU 24, which is part of an example system 10. For this example, the MCU 24 controls various aspects of one or multiple components 70 in response to wireless communications with another entity (a master controller, for example, which is not shown in FIG. 2). As examples, the component(s) 70 controlled by the MCU 24 may include one of more of the following depending on the particular application: a lighting element (such as a light emitting diode (LED), for example); an electrical motor; a household appliance; an inventory control terminal; a computer; a tablet; a smart power meter; a wireless interface; a cellular interface; an interactive touch screen user interface; and so forth. All or part of the components of the MCU 24 may be part of a semiconductor package 30.

As depicted in FIG. 1, the MCU 24, in accordance with example embodiments, includes a radio 152, which may be used for the wireless transmission of packet data to and from the MCU 24 via wireless signals (radio frequency (RF) signals, for example) that are driven to and received from an antenna 232. In this manner, in accordance with example embodiments, the radio 152 may form both a wireless transmitter and a receiver for the MCU 24. Moreover, in accordance with example embodiments, the MCU 24 may include a system memory 120 and an I/O memory 130. The system memory 120 is associated with the main memory for the MCU 24 and may store, as examples, packet data, program variables, data structures, image data, and so forth. The I/O memory 130, in general, refers to the memory space (register addresses) of the peripherals of the MCU 24, such as the registers of DMA engines, universal asynchronous receiver/transmitter (UART), serial peripheral interface (SPI), programmable timers, and so forth.

Figure 2:
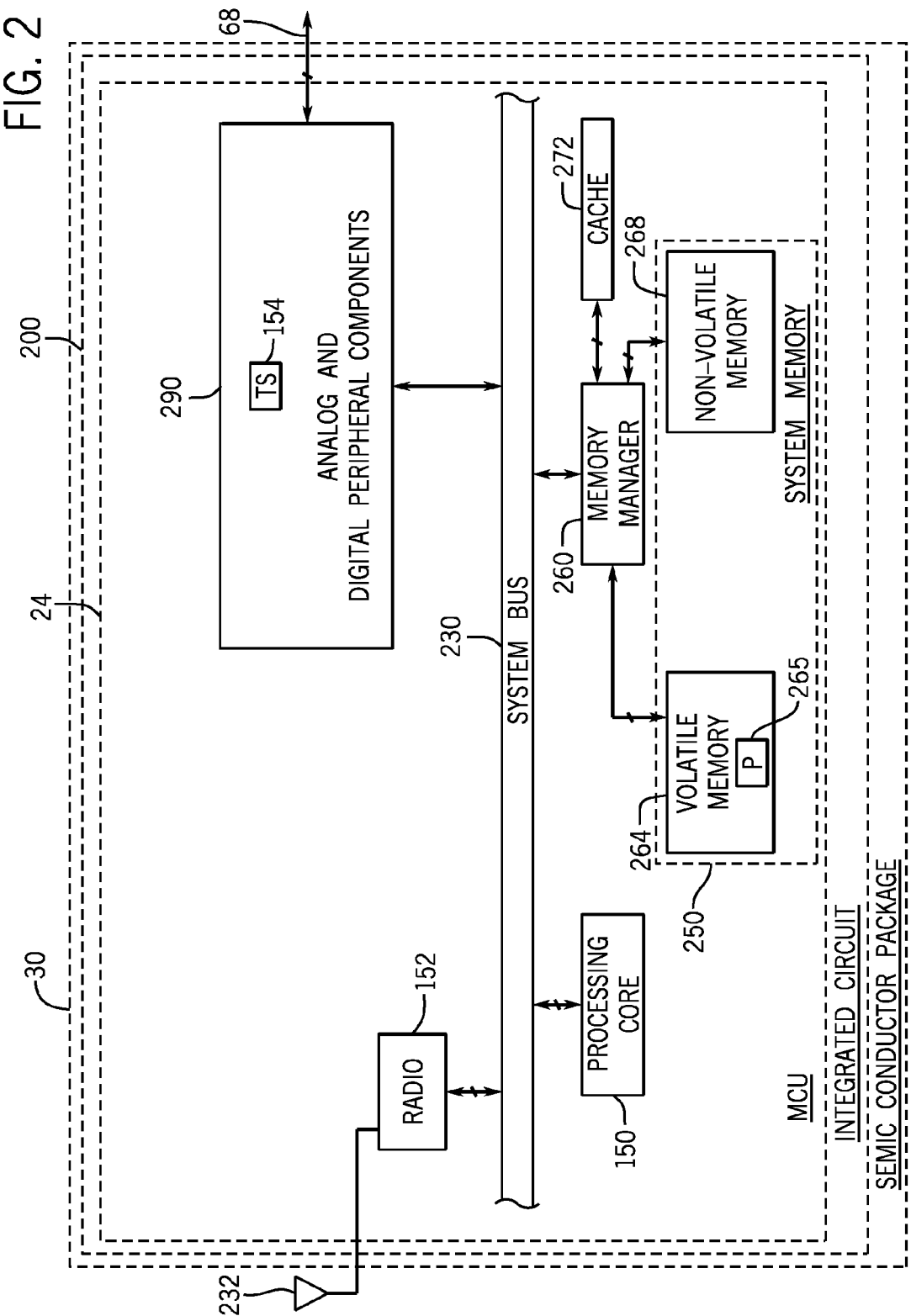
FIG. 2 is a schematic diagram of an MCU of the system of FIG. 1 according to an example embodiment.

Referring to FIG. 2, in accordance with some embodiments, all or part of the components of the MCU 24 may be part of an integrated circuit (IC) 200. As examples, all or part of the components of the MCU 24 may be fabricated on a single die or on multiple dies. The integrated circuit 200 may be packaged to form the semiconductor package 30 (see FIG. 1).

Among its other components, the MCU 24 includes a processing core 150 and analog and digital peripheral components, which among other components, includes a temperature sensor 154. In this regard, the temperature sensor 154 may be constructed to measure the $T_{AMB}$ ambient temperature of the MCU 24. Depending on the particular embodiment, the MCU 24 may not contain any of the components depicted in FIG. 2 other than the processing core 150, the radio 152 and the temperature sensor 154; may contain other and/or additional components than the components that are depicted in FIG. 2; and so forth. Thus, many embodiments are contemplated, which are within the scope of the appended claims.

As an example, the processing core 150 may be a 32-bit core, such as the Advanced RISC Machine (ARM) processing core, which executes a Reduced Instruction Set Computer (RISC) instruction set. In further example embodiments, the processing core 150 may be less powerful core, such as an 8-bit core (an 8051 core, for example).

In general, the processing core 150 communicates with various other system components of the MCU 24, such as a memory controller, or manager 260, over a system bus 230.

In general, the memory manager 260 controls access to various memory components of the MCU 24, such as a cache 272, a non-volatile memory 268 (a Flash memory, for example) and a volatile memory 264 (a static random access memory (SRAM), for example). As depicted in FIG. 2, the volatile memory 264 and the non-volatile memory 268 may form the system memory 120 of the MCU 24. In other words, the volatile memory 264 and the non-volatile memory 268 have memory locations that are part of the system memory address space for the MCU 24.

It is noted that FIG. 2 depicts a simplified representation of the MCU architecture, as the MCU 24 may have many other components, bridges, buses, and so forth, in accordance with further embodiments, which are not depicted in FIG. 2. For example, in accordance with some embodiments, the MCU 24 may have a bus matrix module that implements slave side arbitration and is used to regulate access to the memory devices of the MCU 24.

The analog components of the components 290 include various components that receive analog signals, such as analog-to-digital converters (ADCs) and comparators; and the MCU 24 may contain analog components that provide analog signals, such as current drivers.

The digital components of the MCU 24 may communicate with the processing core 150 over the system bus 230. As examples, the digital components may include a Universal Serial Bus (USB) interface, a UART interface, a system management bus interface (SMB) interface, an SPI interface, and so forth. In general, these digital components communicate with devices that are external to the MCU 24 via I/O terminals 68.

Figure 3:
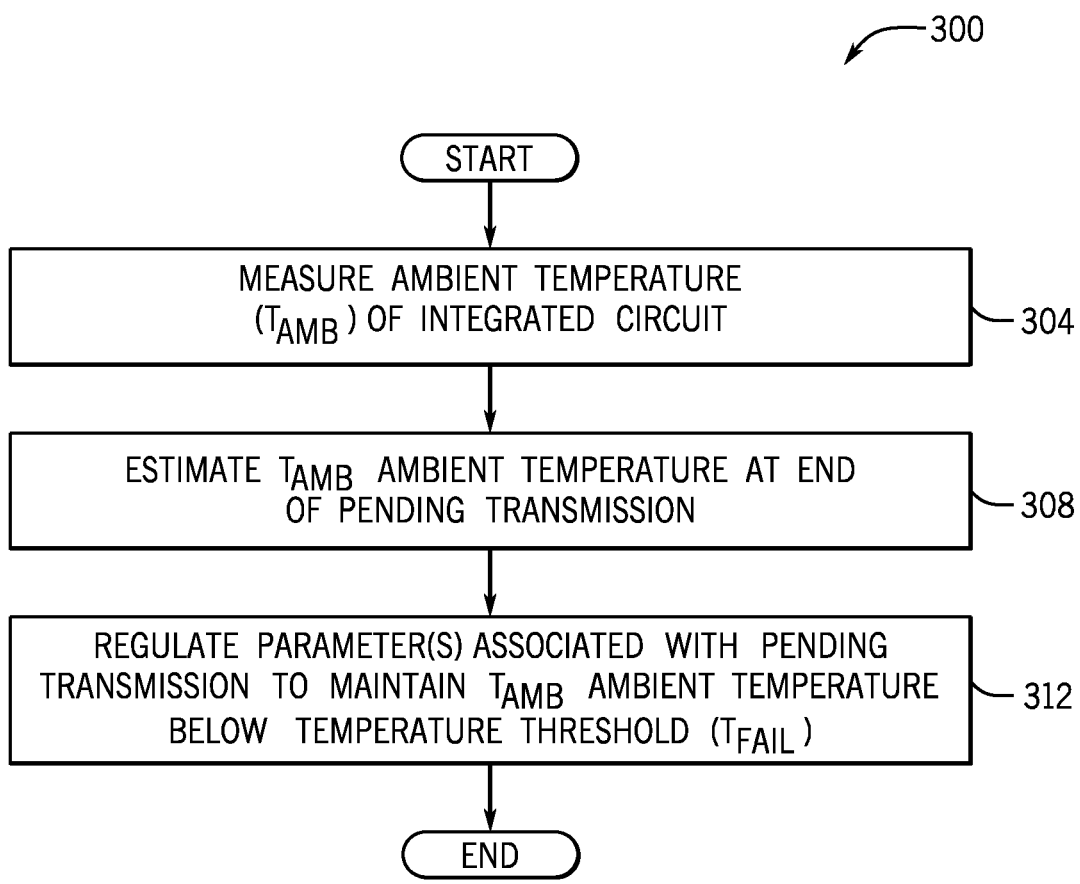
FIGS. 3 and 4 are flow diagrams depicting techniques to regulate a parameter associated with a pending wireless transmission to maintain a temperature of an integrated circuit (IC) below a temperature threshold according to example embodiments.

Referring to FIG. 3 in conjunction with FIG. 2, in accordance with example embodiments, the processing core 150 executes program instructions 265 that are stored in the volatile memory 264 to perform a technique 300 that is depicted in FIG. 3 for purposes of preventing the MCU 24 from operating above the $T_{FAIL}$ maximum operating temperature threshold due to a pending wireless transmission. Thus, the processing core 150 may perform the technique 300 when a transmission queue (a queue of the volatile memory 264 or radio 152, as example) stores at least one pending wireless transmission request, so that a pending transmission is presented to the processing core 150.

Pursuant to the technique 300, the processing core 150 measures (block 304) the $T_{AMB}$ ambient temperature of the IC (reads a temperature value acquired by the temperature sensor 154, for example) and estimates the $T_{AMB}$ ambient temperature at the end of the pending transmission, pursuant to block 308. The processing core 150 controls the radio 152 to regulate a parameter associated with the transmission (e.g., regulate a transmission power level and/or regulates a timing at which the transmission begins, as examples) for purposes of maintaining the $T_{AMB}$ ambient temperature below the $T_{FAIL}$ maximum allowable temperature threshold, pursuant to block 312.

Figure 5:
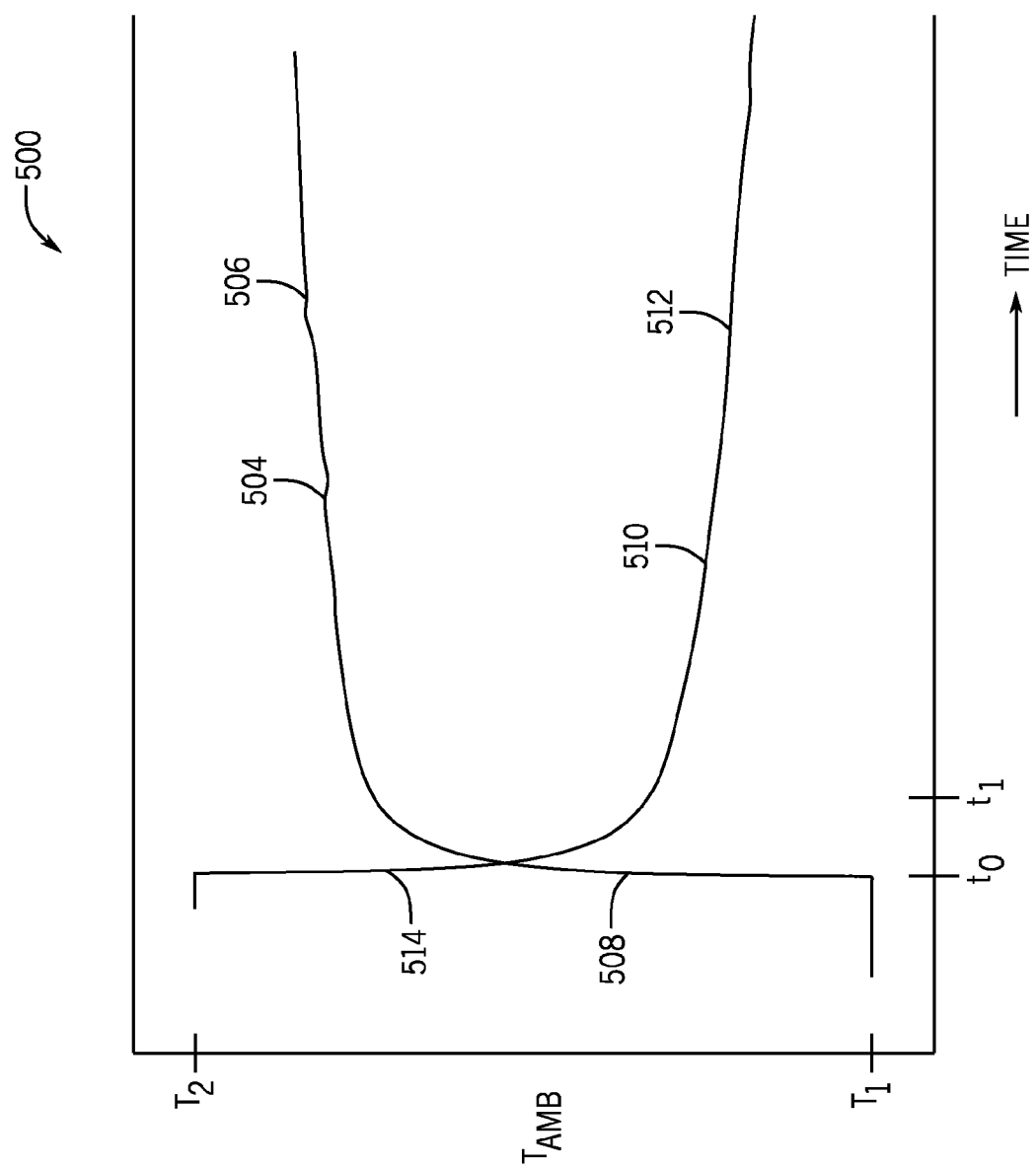
FIG. 5 illustrates ambient temperature curves for an IC associated with transmission activity according to example embodiments.

More specifically, the processing core 150 recognizes that a given wireless transmission from the radio 152 induces self-heating ($T_{SELF}$) of the MCU 24. FIG. 5 is an illustration 500 of example temperature curves for the MCU 24 in connection with wireless transmission activity of the radio 152. Referring to FIG. 5, these curves include a self-heating temperature curve 504, which begins at time $t_0$, when the MCU 24 is at temperature $T_1$. A subsequent transmission causes a relatively rapid rise (as indicated at reference numeral 508) in the temperature curve 504. As depicted in FIG. 5, the temperature curve 504 transitions from the rapid rise portion 508 to an asymptotic portion 506 near time $t_1$, assuming that the wireless transmission(s) continue. Likewise, FIG. 5 illustrates a temperature curve 510, which illustrates a temperature fall off, or decrease, due to the wireless transmission activity ceasing, i.e., a temperature decrease after the radio 152 stops transmitting. For this example, a temperature curve 510 includes a rapidly decreasing portion 514, as well as an asymptotic portion 512. Thus, for given transmissions, which are relatively brief in nature (a few milliseconds, or less), the $T_{AMB}$ ambient temperature of the MCU 24 rises and falls according to the temperature curve portions 508 and 514, respectively.

In accordance with example embodiments, the processing core 150 estimates the $T_{SELF}$ self-heating temperature due to a given pending wireless transmission by taking into account such characteristics of the transmission as the data rate, the packet length and the transmission power. From these parameters, the processing core 150 determines the expected $T_{SELF}$ self-heating due to the transmission of the packet.

It is noted that the processing core 150 may determine the $T_{SELF}$ self-heating temperature using any of a number of techniques, depending on the particular embodiment. For example, in accordance with some embodiments, the processing core 150 retrieves data from a lookup table, which contains relationships between the characteristics of a transmission noted above and the corresponding temperature rise. These values may be derived, for example, from empirical testing of the MCU 24, taking into account the thermal heat transfer characteristics (heat sink(s) thermally coupled to the MCU 24, and so forth). In further embodiments, the processing core 150 may apply a formula to approximate the relationship between the $T_{SELF}$ self-heating temperature and the transmission parameters. Moreover, this formula may be derived from empirical data, in accordance with some embodiments. In accordance with some embodiments, the processing core 150 considers a θj thermal conductivity parameter, which relates the degrees and temperature rise versus the power output. Thus, by calculating the power output attributable to the given transmission and considering the θj thermal conductivity parameter, the processing core 150 may estimate the $T_{SELF}$ self-heating temperature. The use of the θj thermal conductivity parameter is described further below.

Using the estimated $T_{SELF}$ self-heating temperature along with the measured $T_{AMB}$ ambient temperature, the processing core 150 estimates the $T_{AMB}$ ambient temperature of the MCU 24 at the time that the transmission ends, i.e., after the last bit of the packet is transmitted. Thus, using this information, the processing core 150 may determine whether the radio 152 can transmit the pending packet, i.e., perform the pending transmission, without exceeding the $T_{FAIL}$ temperature threshold. Thus, this mechanism allows the MCU 24 to safely and correctly operate at higher ambient temperatures by more accurately measuring the expected temperature rise due to self-heating.

In accordance with example embodiments, in response to the processing core 150 determining that the radio 152 may not transmit the currently queued packet without exceeding the $T_{FAIL}$ maximum temperature, the processing core 150 may not abort the pending transmission. Instead, in accordance with example embodiments, the processing core 150 may employ further corrective action measures, such as taking advantage of a "back off period" that may be part of the wireless transmission protocol that governs wireless communications used by the radio 152.

More specifically, in accordance with example embodiments, the radio 152 may wirelessly communicate using a protocol that is compliant with Institute of Electrical and Electronics Engineers (IEEE) standard 802.15.4, which allows a back up period for purposes of permitting a transmitter in a mesh network from not transmitting when the transmitter detects other transmissions. This may also be referred as a "listen before talk" or a "clear channel assessment," in other wireless communication protocols. Although the back off period may traditionally have been used for purposes of preventing transmission conflicts in a wireless mesh network, the processing core 150 uses the back off period for purposes of regulating the heating of the MCU 24.

More specifically, in accordance with example embodiments, the processing core 150 delays a given pending wireless transmission according to the back off protocol that is set forth in the messaging protocol. As an example, in accordance with some embodiments, if transmission is not allowed (due to a transmission conflict or here, temperature control), a transmitter of the mesh network may undergo a series of successive back off periods, where each of the back off periods begins at a random or pseudo random time and has a progressively increasing duration. Thus, the processing core 150 may, as needed to control the temperature, step through the back off periods until no more back off periods are available.

In this manner, as the processing core 150 steps through the back off periods, the goal is to eventually have a decrease in the temperature of the MCU 24 to allow the pending transmission to occur. If, however, for the worst case, if after stepping through the available back off periods the $T_{AMB}$ ambient temperature is still not at an appropriate level given the estimated $T_{SELF}$ self-heating temperature, the MCU 24 may abort the transmission.

The processing core 150 may estimate the $T_{SELF}$ self-heating temperature using one or more other criteria, in accordance with further embodiments. For example, in accordance with example embodiments, the processing core 150 may estimate the $T_{SELF}$ self-heating temperature based at least in part on a temperature rise history. For example, in accordance with some embodiments, the rate at which the IC decreases, or cools, after a transmission may be observed and logged by the processing core 150. From this observation, the processing core 150 may determine one or more parameters to characterize how the temperature decreases after a transmission and factor this into the estimation of the $T_{SELF}$ temperature rise. More specifically, the $T_{SELF}$ temperature rise is a function of the thermal conductivity of the system. This thermal conductivity, in turn, may not be known based solely on the knowledge of the thermal characteristics of the IC, as other factors, such as packaging issues, may change the overall thermal conductivity value. In this manner, the processing core 150 may estimate the thermal conductivity (described by the θj parameter, for example) of the entire system (IC, semiconductor package, heat sinks, and so forth) by observing the $T_{SELF}$ temperature rise based on a given transmission and then applying this knowledge of the observed thermal conductivity to estimate the $T_{SELF}$ temperature rise for future transmissions.

Figure 4:
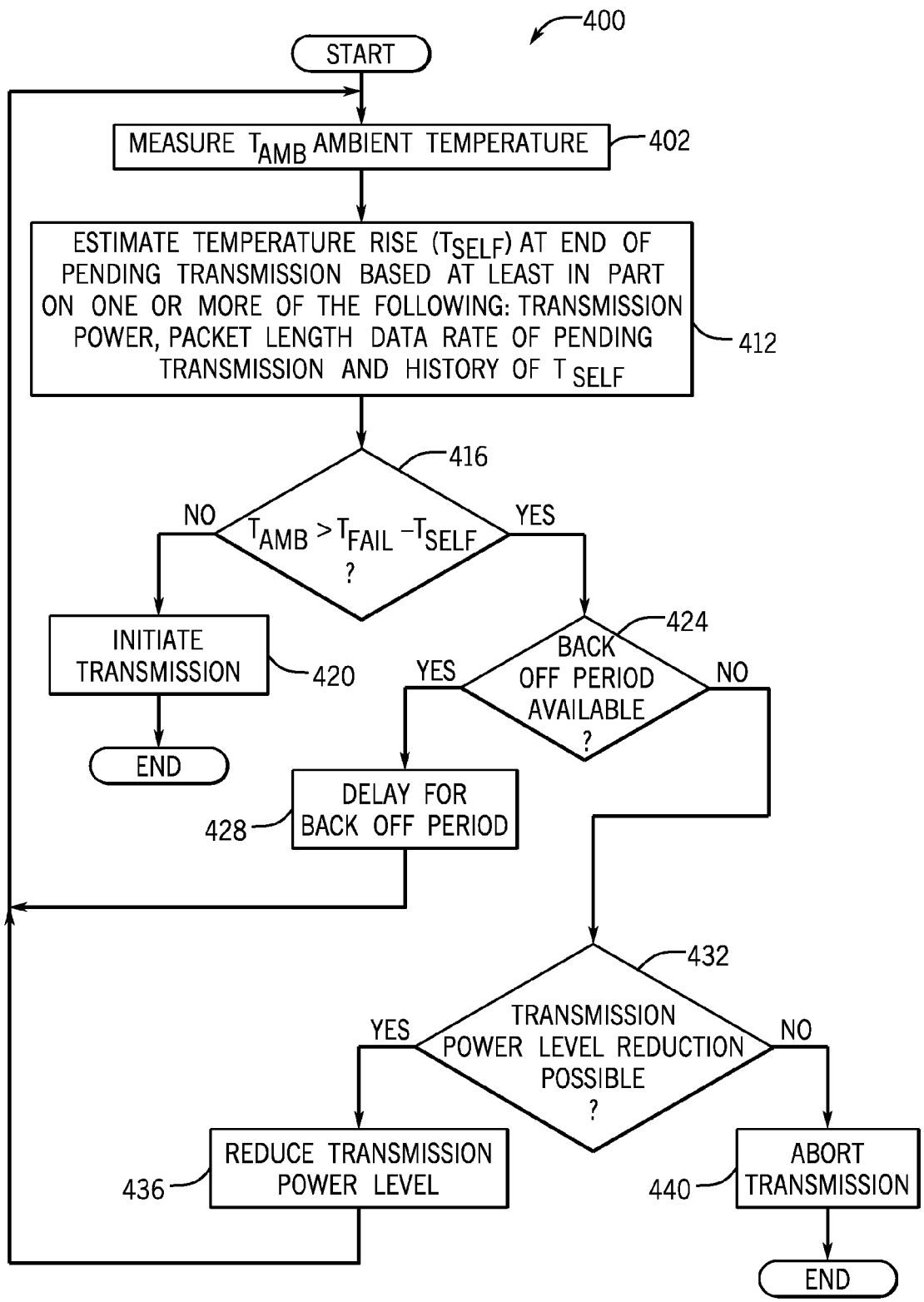

Thus, in accordance with example embodiments, the processing core 150 may perform a technique 400 that is depicted in FIG. 4 for purposes of regulating one or more parameters associated with a given upcoming wireless transmission. Referring to FIG. 4 in conjunction with FIG. 2, pursuant to the technique 400, the processing core 150 measures (block 408) the $T_{AMB}$ ambient temperature and estimates (block 412) the $T_{SELF}$ self-heating temperature at the end of the given pending transmission based at least in part on one or more of the following: the current transmission power, the packet length, the data rate of the transmission and the history of the $T_{SELF}$ self-heating temperature. It is noted that in accordance with example embodiments, the processing core 150 attempts to transmit all packets, such as the packet(s) associated with the given pending transmission, at the maximum power of transmission level. Thus, initially, for a given pending transmission, the processing core 150 calculates the $T_{SELF}$ self-heating temperature based on the assumption that the maximum power transmission level will be used.

Pursuant to the technique 400, the processing core 150 next determines (decision block 416) whether the $T_{AMB}$ ambient temperature of the MCU 24 is sufficiently LOW ENOUGH to initiate the PENDING transmission. In this manner, the processing core 150 determines whether the $T_{AMB}$ ambient temperature is less than $T_{FAIL}-T_{SELF}$. If so, then the $T_{AMB}$ ambient temperature is sufficient, and the processing core 150 initiates (block 420) the transmission by the radio 152. This may occur, in accordance with some embodiments, by the processing core 150 asserting a transmission enable signal to the radio 152, writing an enable bit to a register of the radio 152, and so forth, as examples.

If, pursuant to decision block 416, the processing core 150 determines that the current $T_{AMB}$ ambient temperature of the MCU 24 is not sufficiently low enough to initiate the pending transmission, then the processing core 150 determines (decision block 424) whether a backoff period is available. In this manner, in accordance with example embodiments, a series of potential backoff periods may be available for delaying the pending transmission. This delay, in turn, as discussed herein, allows the MCU 24 to cool off and thus, reduces the $T_{AMB}$ ambient temperature of the MCU 24. Therefore, if a backoff period is available (pursuant to decision block 424), the processing core 150 waits, or delays, for the backoff period, pursuant to block 428 and control returns to block 408 where the processing core once again measures the $T_{AMB}$ ambient temperature and determines whether initiation of the transmission may begin, as described above.

If, however, a backoff period is not available pursuant to decision block 424, the processing core 150 takes a second remedial action. In this manner, as depicted in FIG. 4, the processing core 150 determines (decision block 432) whether a reduction in the transmission power level is possible. As noted above, initially, the processing core 150 attempts to transmit at the maximum transmission power level, and if the temperature conditions do not allow the transmission, several reduced transmission power levels may be available; and as such, the processing core 150 may step through these power levels to progressively reduce the power level, pursuant to block 436. For each reduced power level, control may then proceed to block 408 for another determination of whether the transmission may be initiated. If, however, the processing core 150 determines (decision block 432) that a further reduction in the transmission power level is not possible, then the processing core 150 may abort the transmission, pursuant to block 440.

In accordance with further example embodiments, the processing core 150 deterministically takes into account the cooling of the MCU 24 when the radio 152 is not currently transmitting. In this regard, in accordance with example embodiments, the processing core 150 may apply a formula or retrieve values from a lookup table to estimate the expected cooling profile of the MCU 24 from the current time to the time at which a pending transmission is to end. The processing core 150 may further consider the cooling history for the calculations for purposes of refining this calculation, as the cooling history takes into account the overall thermal conductivity of the system. Thus, the processing core 150 may consider two factors: the heating of the MCU 24 due to the transmission and the tendency of the MCU 24 to cool over time.

Figure 6:
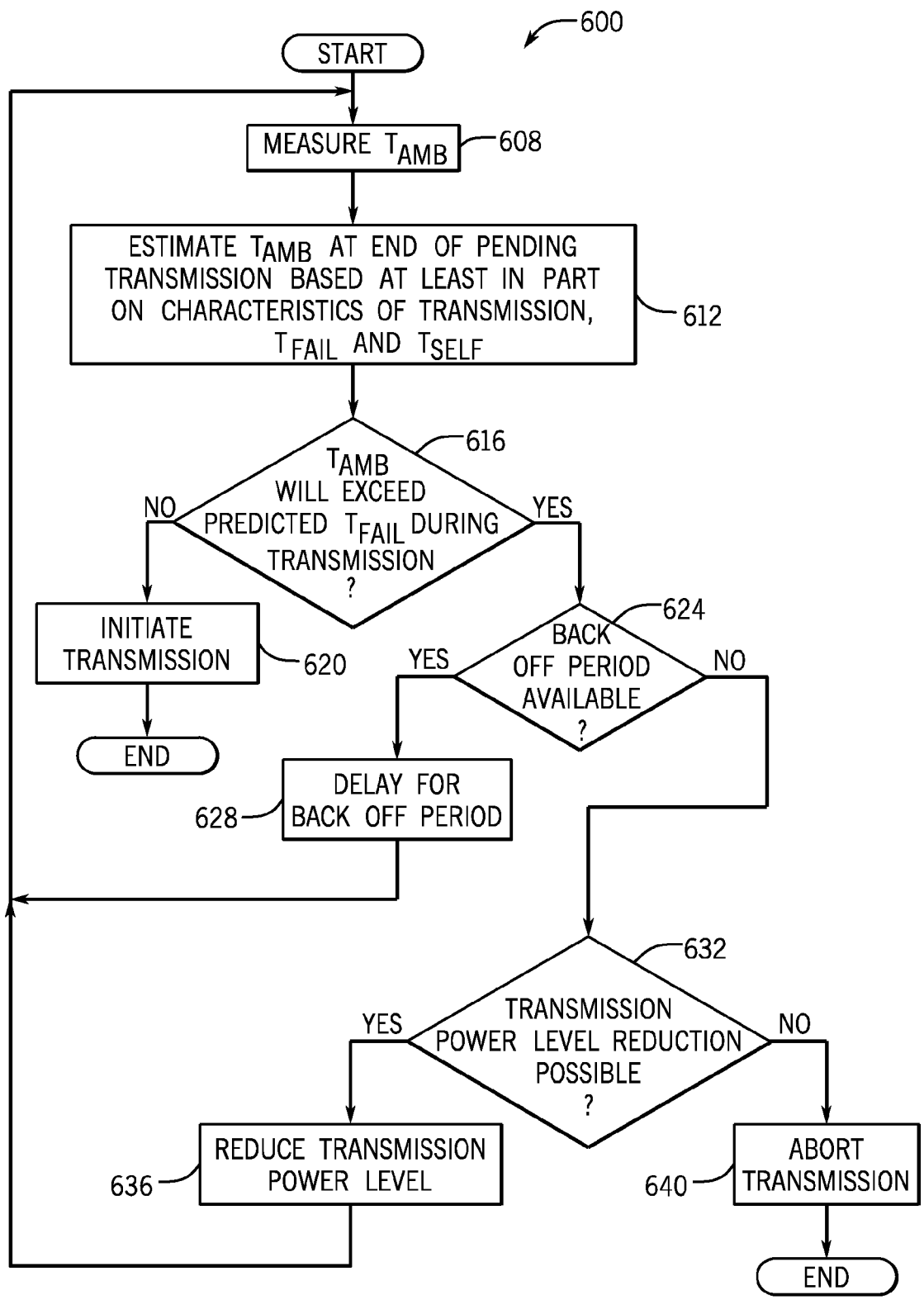
FIG. 6 is a flow diagram depicting a technique to regulate a parameter associated with a pending transmission to maintain a temperature of an IC below a temperature threshold according to an example embodiment.

Therefore, referring to FIG. 6 in conjunction with FIG. 2, in accordance with example embodiments, the processing core 150 may perform a technique 600 that is depicted in FIG. 6. Pursuant to the technique 600, the processing core 150 measures $T_{AMB}$ ambient temperature, pursuant to block 608 and estimates (block 612) the $T_{AMB}$ ambient temperature at the end of the pending transmission based at least in part on characteristics of the transmission, the expected decrease in the temperature ($T_{FAIL}$) and the $T_{SELF}$ self-heating. The processing core 150 then determines (decision block 616) whether the $T_{AMB}$ ambient temperature will exceed the $T_{FAIL}$, maximum temperature threshold during the transmission, and if not, the processing core 150 initiates (block 620) the transmission.

Otherwise, in accordance with some example embodiments, the processing core 150 performs a similar technique to the one described above in connection with the technique 400. In this manner, processing core 150 determines (decision block 624) whether a backoff period is available and if so waits, or delays, for the backoff period (block 628) before returning to block 608. If no backoff period is available, then the processing core 150 reduces the power transmission level (block 636) if a decision is made (decision block 632) that a reduction in the transmission power is possible. If not, the processing core 150 aborts the transmission, pursuant to block 640.

Although specific example embodiments are discussed herein in which the processing core 150 regulates operation of the radio 152 via the execution of machine executable instructions, it is noted that in accordance with further example embodiments, the MCU 24 may have dedicated logic (a field programmable array, or other hardwired logic) for purposes of controlling the MCU's wireless transmission to regulate the MCU's temperature. Moreover, in accordance with yet further example embodiments, the MCU 24 may have the combination of processor core-based and hardwired circuitry-based logic to control the transmissions.

Figure 7:
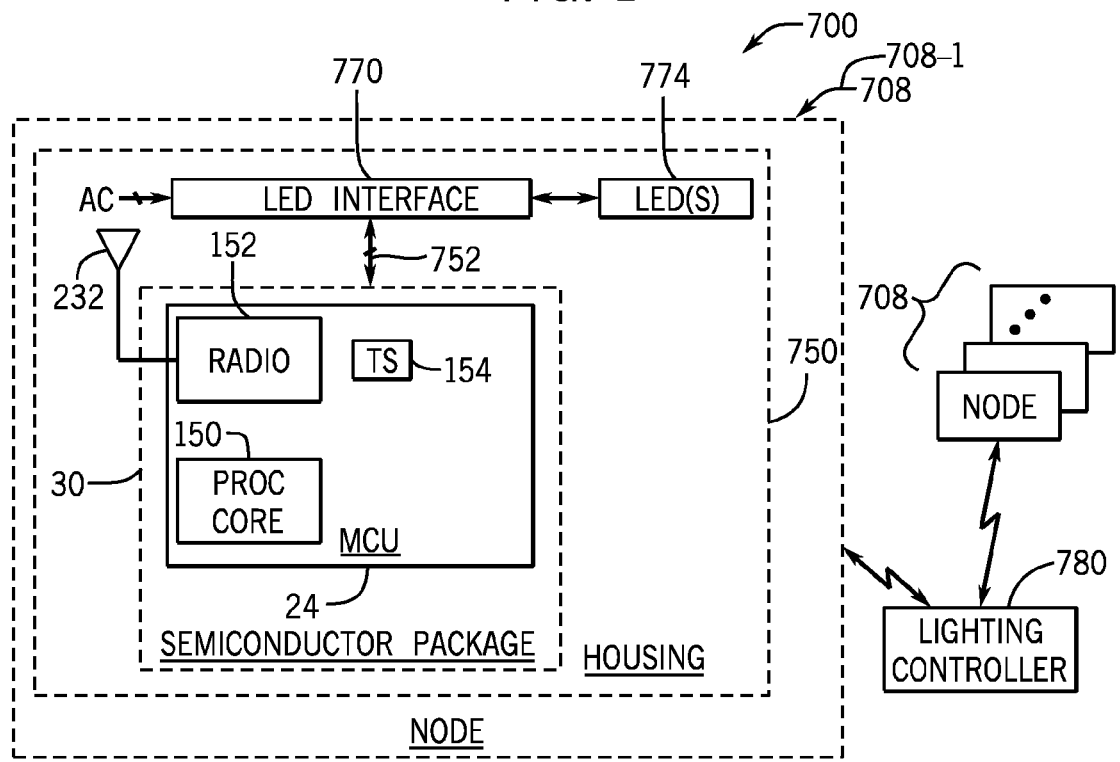
FIG. 7 is a schematic diagram of an MCU-based lighting system according to an example embodiment.

Referring to FIG. 7, in accordance with some embodiments, the MCU 24 may be part of a node 708-1 that, in turn, may be part of a light emitting diode (LED) lighting system 700. In this manner, nodes 708 of the system 700, such as the node 708-1, along with other nodes, such as a lighting system controller 780, may wirelessly communicate as part of a mesh network. As examples, the mesh network may be part of a home automation, industrial automation, remote control or security system, as just a few examples. As a further example, in accordance with some embodiments, the nodes may form a Z-Wave or Zig Bee mesh network.

As depicted in FIG. 7, in accordance with some embodiments, the node 708-1 may be packaged in a housing 750 to form an LED lighting assembly (a "light bulb," for example), which contains the MCU 24; and one or multiple lighting elements, such as LED(s) 774. The housing 750 may, for example, contain a glass bulb at one end for emitting light from the LED(s) 774 and contain a threaded coupling at the other end to threadably attach the lighting assembly to a light bulb receptacle, or socket.

The radio 152 of the MCU 24 for this example embodiment wirelessly communicates with the lighting controller 780 via the mesh network for such purposes as turning on and off the LED(s) 774 of the node 708-1 and setting the lighting level of the LED(s) 774 to a particular programmed level (a brightness level of 70%, for example). As such, the radio 152 may receive commands from the lighting controller 780 via wireless transmissions originating with the controller 780; and the radio 152 may generate wireless transmissions for such purposes as acknowledging receipt of commands from the lighting controller 780; providing data indicative of requested information (data representing the programmed brightness level for the node 708-1, for example); and so forth.

Because of the heating of the MCU 24 due to the operation of the LED(s) 774 and the close proximity of the LED(s) 774 and MCU 24 within the lighting assembly, the $T_{AMB}$ ambient temperature of the MCU 24 may be relatively high and near the $T_{FAIL}$ maximum operating temperature for the MCU 24, thereby establishing a relatively small temperature margin for the MCU 24 to operate. As an example, the $T_{FAIL}$, maximum operating temperature may be a temperature near or at 140° C.; and the steady state $T_{AMB}$ ambient temperature for the MCU 24 when no self-heating is present due to operation of the MCU 24 (and thus, primarily due to the heat generated by operation of the LED(s) 774), the MCU 24 may have a temperature operating margin of approximately 15° C. The systems and techniques that are disclosed herein permit the MCU 24 to operate within such a relatively small temperature operating margin.

For the example of FIG. 7, the MCU 24 may generate/receive input and output signals (I/O signals) at I/O terminals 752 in connection with the control of an LED interface 770 that regulates the communication of power to the LED(s) 774 for purposes of controlling the on/off status of the lighting assembly and the brightness level of the assembly when turned on. As depicted in FIG. 7, the LED interface 770 receives an AC line voltage (110V AC, for example) and is constructed to convert the AC power into DC power for the LED(s) 774.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   estimating a temperature change to an integrated circuit associated with a pending transmission from the integrated circuit; and
   based on the estimated temperature change, regulating at least one parameter associated with the pending transmission to maintain a temperature of the integrated circuit below a temperature threshold, wherein regulating the at least one parameter comprises selectively using a back off time period to regulate a timing of the transmission to maintain the temperature of the integrated circuit below the temperature threshold, and wherein the back off time period is associated with a transmission protocol to avoid a conflict with transmission by a device other than the integrated circuit.

2. The method of claim 1, wherein regulating the at least one parameter comprises regulating a timing of the transmission.

3. The method of claim 1, wherein regulating the at least one parameter comprises delaying the transmission to allow a temperature of the integrated circuit to decrease.

4. The method of claim 1, wherein estimating the temperature change comprises estimating the temperature change based at least in part on a thermal conductivity of the integrated circuit derived from an observed history of the temperature of the integrated circuit in association with a previous transmission.

5. The method of claim 1, wherein estimating the temperature change comprises estimating the temperature change based at least in part on a scheduled transmission power level and an expected time over which the transmission is to occur.

6. The method of claim 1, wherein estimating the temperature change comprises estimating the temperature change based at least in part on a power level associated with the pending transmission, a data rate associated with the pending transmission and a packet length associated with the pending transmission.

7. An apparatus comprising:
   a temperature sensor to sense an ambient temperature;
   an integrated circuit comprising:
      a radio; and
      a processing core to:
         estimate a temperature change to the integrated circuit in response to a pending transmission by the radio;
         control the radio to regulate at least one parameter of the pending transmission based at least in part on the ambient temperature sensed by the temperature sensor and the estimated temperature change; and
         selectively use a back off time period to regulate a timing of the transmission to maintain the ambient temperature below a predetermined temperature, wherein the back off time period is associated with a transmission protocol to avoid a conflict due to a transmission by a device other than the integrated circuit.

8. The apparatus of claim 7, wherein the processing core is adapted to selectively change a power level at which the transmission occurs based at least in part on the sensed ambient temperature and the estimated temperature change.

9. The apparatus of claim 7, wherein the processing core is adapted to, in response to determining that the ambient temperature will exceed the predetermined temperature during the transmission, delay the transmission for a predetermined period, and at the end of the predetermined period, selectively reduce power associated with the transmission based at least in part on another sensing of the ambient temperature by the temperature sensor.

10. The apparatus of claim 7, wherein the pending transmission comprises a wireless transmission of bits associated with a data packet.

11. The apparatus of claim 7, wherein the processing core is adapted to estimate the temperature change based at least in part on a scheduled transmission power level associated with the pending transmission and an expected time associated with the transmission.

12. The apparatus of claim 7, wherein the processing core is adapted to estimate the temperature change based at least in part on a transmission level associated with the pending transmission, a data rate associated with the pending transmission and a packet length associated with the pending transmission.

13. An apparatus comprising:
   a lighting element; and
   an integrated circuit comprising a packet radio and a processing core to use the radio to communicate with a lighting controller to regulate operation of the lighting element,
   wherein the processing core is adapted to estimate a temperature change to the integrated circuit associated with a pending transmission by the radio, and based at least in part on the estimated temperature change, regulate at least one parameter associated with the pending transmission, wherein the regulation of the at least one parameter comprises selectively using a back off time period to regulate a timing of the transmission to maintain a temperature of the integrated circuit below a predetermined temperature, and wherein the back off time period is associated with a transmission protocol to avoid a conflict due to a transmission by a device other than the packet radio.

14. The apparatus of claim 13, wherein the processing core is adapted to estimate the temperature change based at least in part on a power level associated with the transmission, a data rate associated with the pending transmission and a packet length associated with the pending transmission.

15. The apparatus of claim 13, further comprising a light assembly housing, wherein the lighting element and the integrated circuit are mounted to the housing.

16. The apparatus of claim 13, wherein the processing core selectively regulates a transmission power of the radio to maintain the temperature of the integrated circuit below the predetermined temperature.

17. The apparatus of claim 13, wherein the processing core regulates the pending transmission to maintain the temperature of the integrated circuit below the predetermined temperature based at least in part on a sensed ambient temperature of the integrated circuit.

* * * * *